United States Patent
Buckbee, Jr.

(10) Patent No.: US 8,762,301 B1
(45) Date of Patent: Jun. 24, 2014

(54) AUTOMATED DETERMINATION OF ROOT CAUSE

(75) Inventor: George Charles Buckbee, Jr., Clarks Summit, PA (US)

(73) Assignee: Metso Automation USA Inc., Shrewsbury, MA (US)

( * ) Notice: Subject to any disclaimer, the term of this patent is extended or adjusted under 35 U.S.C. 154(b) by 288 days.

(21) Appl. No.: 13/317,221

(22) Filed: Oct. 12, 2011

(51) Int. Cl.
*G06F 15/18* (2006.01)
*G06N 99/00* (2010.01)

(52) U.S. Cl.
CPC .................................. *G06N 99/005* (2013.01)
USPC ................................ 706/12; 702/85; 714/100

(58) Field of Classification Search
None
See application file for complete search history.

(56) References Cited

U.S. PATENT DOCUMENTS

| | | | |
|---|---|---|---|
| 6,017,143 A | 1/2000 | Eryurek | |
| 6,298,454 B1 | 10/2001 | Schleiss | |
| 6,405,140 B1 | 6/2002 | Chen | |
| 6,549,864 B1 | 4/2003 | Potyrailo | |
| 6,557,118 B2 | 4/2003 | Schleiss | |
| 6,615,090 B1 | 9/2003 | Blevins | |
| 7,085,610 B2 | 8/2006 | Eryurek | |
| 7,349,746 B2 | 3/2008 | Emigholz | |
| 7,752,012 B2 | 7/2010 | Kavaklioglu | |
| 8,255,353 B2 * | 8/2012 | Zhang et al. | 706/52 |
| 8,364,519 B1 * | 1/2013 | Basu et al. | 705/7.38 |
| 2002/0038156 A1 | 3/2002 | Eryurek | |
| 2005/0278273 A1 | 12/2005 | Uthe | |
| 2008/0140225 A1 | 6/2008 | Shneyder | |
| 2008/0276253 A1 | 11/2008 | Khandrika | |
| 2009/0049338 A1 | 2/2009 | Unnikrishnan | |
| 2009/0240366 A1* | 9/2009 | Kaushal et al. | 700/110 |
| 2010/0050023 A1 | 2/2010 | Scarpelli | |
| 2010/0095158 A1 | 4/2010 | Shah-Hosseini | |

OTHER PUBLICATIONS

Venkat Venkatasubramanian et al, "A review of process fault detection and diagnosis Part III: Process history based methods", Computers & Chemical Engineering, vol. 27, 2003.
James J. Rooney and Lee N. Vanden Heuvel, "Root Cause Analysis for Beginners", Quality Progress, Jul. 2004, Milwaukee, WI, USA.
S. Dey, "A Bayesian network approach to root cause diagnosis of process variations", International Journal of Machine Tools and Manufacture, vol. 45, Issue 1, Jan. 2005.
John Paul MacDuffie, "The Road to Root-Cause: Shop-Floor Problem-Solving Case Studies at Three Auto Plants", Management Science, Apr. 1997 vol. 43.
Bjorn Andersen, Root Cause Analysis: Simplified Tools and Techniques, ASQ Quality Press, Dec. 1999, Milwaukee, WI, USA.
Amir Wachs, Daniel R. Lewin, "Improved PCA methods for process disturbance and failure identification ", AIChE Journal vol. 45, Issue 8, pp. 1688-1700, 1999, New York.
Bauer, M., et al, "Finding the Direction of Disturbance Propagation in a Chemical Process Using Transfer Entropy", Control Systems Technology, IEEE Transactions, vol. 15, 2007.

* cited by examiner

*Primary Examiner* — Alan Chen
(74) *Attorney, Agent, or Firm* — Henry L. Smith, Jr.

(57) ABSTRACT

An exemplary embodiment includes a diagnostic which can identify the source, or "root cause" of variability of process and process control parameters. A plurality of correlations is provided, each representing a possible cause of variation. One of the correlations is identified as the most likely root cause of variation. The remaining possible root causes are also listed, in sequence, from most likely to least likely. The method applies to both normal and abnormal operating conditions.

20 Claims, 3 Drawing Sheets

AUTOMATED DETERMINATION OF ROOT CAUSE

BACKGROUND AND TECHNICAL FIELD

One useful embodiment or variation of the invention relates to the following field, although the invention may also relate to other fields and uses. The invention may have various embodiments and variations. This patent relates generally to performing diagnostics and determining the root cause of variability in a process plant. For example, this invention can be assess variations in product quality, determining the root cause of these variations, even though that root cause may be far upstream in the plant.

BACKGROUND

Description of Related Art

Typical of the art related to widely useful embodiments and variations of the present invention are following patents and publications. The following examples of related art and its limitations are illustrative and not exclusive. Other limitations of the related art will become apparent to those skilled in the art upon study of the specification and drawings of this application. Other embodiments and variations of the invention may relate to other arts and uses.

In a process plant, there are many possible sources of variation to process quality, energy consumption, production rate, or other important variables. This variability may come from raw materials, from ambient conditions, from operation procedures, poor control, routine tasks, batch cycles, operator interventions, process upsets, load changes, equipment malfunctions, or many other sources.

Variation that enters the process in one location moves around the process plant, following the paths of process materials and by-products, energy usage and re-usage, and linked in some cases by control strategies. The process may be complex or poorly understood, with limited or no dynamic process model available. For example, a typical oil refinery may have thousands of process measurements and control loops. Materials do not flow directly through the refinery from beginning to end. They often are recycled, blended, or used in many locations. This makes it very difficult to determine a process model of the entire facility.

Process control systems, like those used in chemical, petroleum or other processes, typically include one or more centralized or decentralized process controllers. These controllers connect to field instrumentation, such as temperature, pressure, level, and flow instruments. The controllers may also connect to analytical or laboratory instrumentation, to measure or control pH, composition, or other properties. The controllers may also connect to output devices, allowing control over valves, heaters, variable-speed drives, dampers, and other devices.

Continuous streams of data are available from all of these connected devices. In some control systems, this information is fed into a data historian, allowing for tracking or trending of the data.

Software tools have arisen, to take advantage of these streams of process data. For example, Alarm Management Software, such as that made by TiPS Incorporated, gathers information about process alarms, tallies the results, and can be used to prioritize among the various competing alarms, or even to re-design the way that alarms are handled. Another example is Bearing and Vibration Analysis tools, which look at high-frequency information concerning vibration of rotating equipment. Sudden changes in vibration power or frequency can indicate impending failures.

Some applications, for example, U.S. Pat. No. 6,549,864, issued Apr. 15, 2003 to Ptyrailo, entitled "Multivariate statistical process analysis systems and methods for the production of melt polycarbonate", have analyzed process data, correlated it with desired result parameters, and used a model to predict performance, or to ensure that process parameters stay within a desired range.

Another approach, used in U.S. Pat. No. 7,085,610, issued Aug. 1, 2006 to Eryurek, entitled "Root cause diagnostics", uses process signals in combination with process models based on the physical implementation of a process to determine the root cause of an aberration of the process. This method allows the user to apply a-priori knowledge of the process, where there is a known relationship between the various possible causes and the end-result aberration. For example, if the user expects to see upsets originating in the steam supply system, Eryurek would first develop a model of the steam-to-process interaction, then use this model to evaluate root causes.

A variety of other methods, including neural networks, fuzzy logic, and principal component analysis (PCA) have also been used to provide diagnostic and root cause analysis for expert users. U.S. Pat. No. 7,349,746, issued Mar. 25, 2008 to Emigholz, is an example of the PCA approach.

The above techniques are limited in their scope and approach. It would also be desirable to identify the source or "root cause" of process variation, whether or not it is strong enough to cause an aberration in process operation. It would be even more desirable to do this without the benefit of a priori process knowledge or the development of models. This targeted information can be used to direct engineers, operators, and management to the original root cause of process variation, prior to the point of significant process upset. The proposed invention avoids the limitations of the above techniques. This invention determines root cause without need for a-priori process models, eliminating several costly and time-consuming steps. Because there is no reliance on models, the invention works across a broad array of processes, including traditional process manufacturing and batch manufacturing. It can also be applied to more complex systems, such as biological systems, weather, and financial systems. Finally, this invention requires less mathematical knowledge on the part of the end user. The user interface presents information graphically, for example in color codes, so that end users are informed in terms that are meaningful to them.

SUMMARY

One of the widely useful embodiments and variations of the present invention may be summarized as follows. This embodiment or variation is exemplary only. Other embodiments and variations will become apparent to those skilled in the art upon study of the specification and drawings of this application. Other embodiments and variations of the invention may relate to other arts and have usefulness in those arts.

One embodiment of the present invention identifies the root cause of variation to a primary reference variable. The invention looks at time-series data from a primary reference variable, and cross-correlates that with similar data from many other variables. From the cross-correlation results, the system determines the strengths of correlation and the respective leads and lags. The system then determines which measurement is the most likely root cause of variation in the primary measurement. The remaining measurements are ranked in order of likelihood that they are the root cause of variation.

For example, a paper-making customer may be concerned with variations in product moisture. Moisture variations may lead to rejected or downgraded product. The real-time moisture measurement becomes the reference signal. The invention then looks at time-series data from other measures within the plant, such as stock flows, steam pressures, dryer temperatures, and tank levels. The correlations can be evaluated on a scale from zero (no correlation), to 1 (perfect correlation). To complete the cross-correlation analysis, the correlations are evaluated across a range of data time-shifts. For each signal, the peak correlation and its corresponding time shift are defined. Some signals are disqualified, because they do not show a strong correlation. The invention then selects the signal which has the longest lead time at its peak correlation value, and identifies it as the likely root cause.

Purposes and Advantages

The invention may have various embodiments and variations and may be useful in different fields and for different purposes. The purposes and advantages of the more widely useful embodiments or variations of the present invention include, but are not limited to, the following, and may include other purposes and advantages in different fields of use not listed herein:
1. The invention may be used to determine the root cause of routine variation in a manufacturing process.
2. While this method can be used to determine root cause of aberrations such as quality upsets or alarms, it has an advantage in finding the root cause of variation even under normal, non-aberrant conditions.
3. A major advantage of this approach is that no a-priori process knowledge is required. For example, the user does not need to identify which signals are up-stream or downstream from the reference. Also, no process models are required. The root cause can be determined without regard to physical description of the process.
4. The present invention applies to evaluation of many different types of correlated time-series data, including:
   a. Data from manufacturing processes
   b. Financial Information
   c. Weather
   d. Discrete and continuous data sets. Discrete data may come from a batch process, or from the manufacture of discrete parts, such as automobiles. Continuous data may come from a continuous process, such as a chemical plant or oil refinery.
5. A further advantage of this method is the ability to present a prioritized list of likely root causes.
6. This invention has the advantage that the scope of investigation can cast across all manner of possible sources, including control loops, process measurements, laboratory analytical results, weather, raw materials, and many other sources.

BRIEF DESCRIPTION OF THE DRAWINGS

This Brief Description and the Detailed Description Of The Drawings cover only some embodiments and variations of the invention, and other embodiments and variations will be clear to those skilled in the art from the description, drawings, and Alternative and Additional Embodiments, etc. The Drawings are illustrative and not limiting.

DETAILED DESCRIPTION OF THE DRAWINGS

Figure 1:
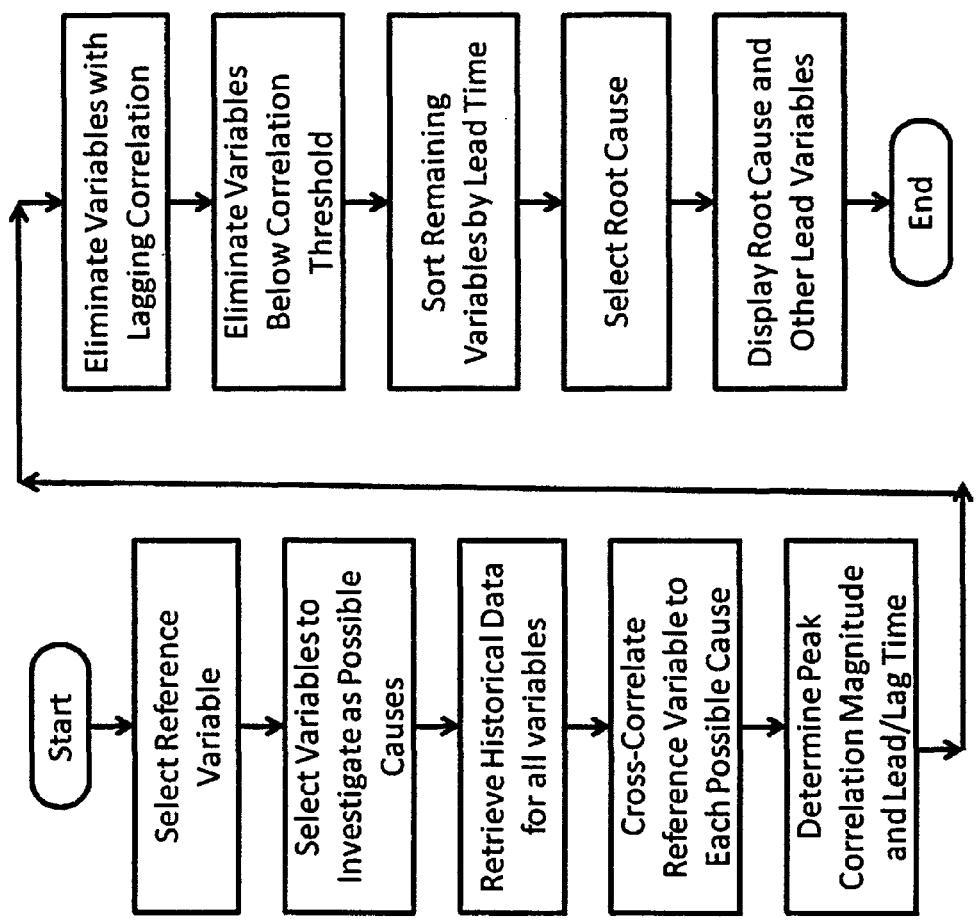
FIG. 1 shows a flowchart of a computerized method to determine the root cause of process variability.
CHART A shows a matrix showing cross-correlation strengths.
Chart B shows an example result, where the peak value in each row is highlighted using bold text.

FIG. 1 shows a flowchart of a computerized method to determine the root cause of process variability.

The flowchart shows the procedure for determining the root cause. The reference variable is selected first. The variable selected is often an important process parameter, such as a product quality attribute, or a financial variable, such as energy cost per ton of production.

The next step is to identify the scope of the search for root cause. This may be as broad as the complete set of data available for a given facility. Or, the user may select to narrow the search to a specific set of possible causes.

Once the reference variable and the possible causes are identified, a set of historical data is selected. The set of historical data may be from the recent past, or it may be from an historical period, related to a particular incident. To simplify the upcoming mathematical analysis, historical data may be modified. Modifications of the data include cleansing and lumping.

Cleansing refers to the removal of unqualified data. Process measurements from an offline processing unit should be excluded. Process data is also cleansed by checking against qualification tests. Qualification tests include checking for values that are outside of allowable ranges and null values. These must be removed from analysis.

Data lumping is done for mathematical efficiency. Process data may include high-frequency data at once per second or faster. Depending on the resolution of the root cause analysis charts, such high speed data could greatly slow the computations, while adding little value to the result. For example, a 12-hour root-cause analysis could have a resolution window of 15 minutes. Data within that 15 minute window can be lumped before the start of the cross-correlation analysis. Data lumping refers to sampling and averaging of data within each window of resolution.

The data is evaluated over a series of time-shifted data sets. For a selected time span, data is evaluated over 2N+1 time windows, starting at N leading shifts, passing through zero, and ending at N lagging time shifts, where each time window is equal to the total time period divided by 2N+1.

Then, cross-correlation analysis is completed using equation 1. Mathematically, the cross-correlation is expressed using equation 1, where f is the reference signal, and g is the possible cause.

The cross-correlation analysis returns an array of data for each pairing of reference variable to possible cause variable. Each element in the array represents the correlation strength when the possible cause variable is shifted in time by a particular lead or lag value as shown in CHART A.

$$(f \star g)(t) \stackrel{def}{=} \int_{-\infty}^{\infty} f^*(\tau)g(t+\tau)d\tau; \qquad \text{Equation 1}$$

Within each array, the peak correlation is selected, that being the largest absolute value correlation occurring within that array. Both the magnitude and the lead/lag time of the peak value are determined. These are referred to as the "peak correlation strength" and the "peak correlation lead/lag". Chart B shows an example result, where the peak value in each row is highlighted using bold text.

If the peak value lags the reference signal, the variable is eliminated as a possible cause. Lagging values indicate that the variation in the possible cause follows, or lags, the reference variable. A lagging signal cannot be a root cause, because it follows the reference variable, rather than leads it.

More variables may be eliminated as possible root cause if the peak correlation strength does not exceed a particular threshold value. Weak correlations are not as likely to be the true root cause.

The remaining possible causes are sorted by the value of their peak correlation strength.

The signal with the greatest lead time is the most likely root cause.

The results are displayed, with all signals sorted from greatest lead to greatest lag. The data may be displayed in text format, or in a graphical format.

CHART A shows a matrix showing cross-correlation strengths.

Each row in the matrix represents the correlations between a particular possible cause signal and the reference signal. If there is a strong correlation, then knowing the value of the reference signal at one instant in time, allows you to reasonably estimate the value of the reference signal at a future time. Note that the reference signal is correlated to itself, using the auto-correlation calculation. In practical application, signals in real-world applications have strong auto-correlations. For example, if a car is driving at 50 miles per hour at this moment, there is a very strong chance that the car will still be driving at 50 miles per hour one second from now. As the lag time increases, the auto-correlation drops off. One hour from now, the car's speed is likely to be very different, and not at all correlated with its present speed.

Each column represents a different amount of time shift. The central column represents zero time shift. Correlation coefficients shown in the central column can be determined by directly correlating a set of data from the reference signal with data from another signal, over the exact same time period.

Columns to the left and right of the central column hold correlations developed by shifting the possible cause data time period. The historical data for the possible cause is shifted in time before determination of the correlation coefficient. For example, in CHART B, possible cause #1 has its peak absolute value of 0.61 in the column two lag positions to the left of center. This means that this signal lags, or follows, the reference signal. When the reference signal moves significantly, possible cause #1 is likely to move 2 minutes later.

Columns to the right of the central column indicate the correlations when the data for possible cause leads the reference signal. Columns to the left indicate correlations when the possible cause signal lags the reference signal. Referring again to CHART B, possible causes #2 and #3 show strong correlations on the right side of the chart.

Mathematical methods may be employed to streamline the calculation process. In the case of the current invention, the Fast Fourier transform is used for faster calculation of the cross-correlation matrix.

Figure 3:
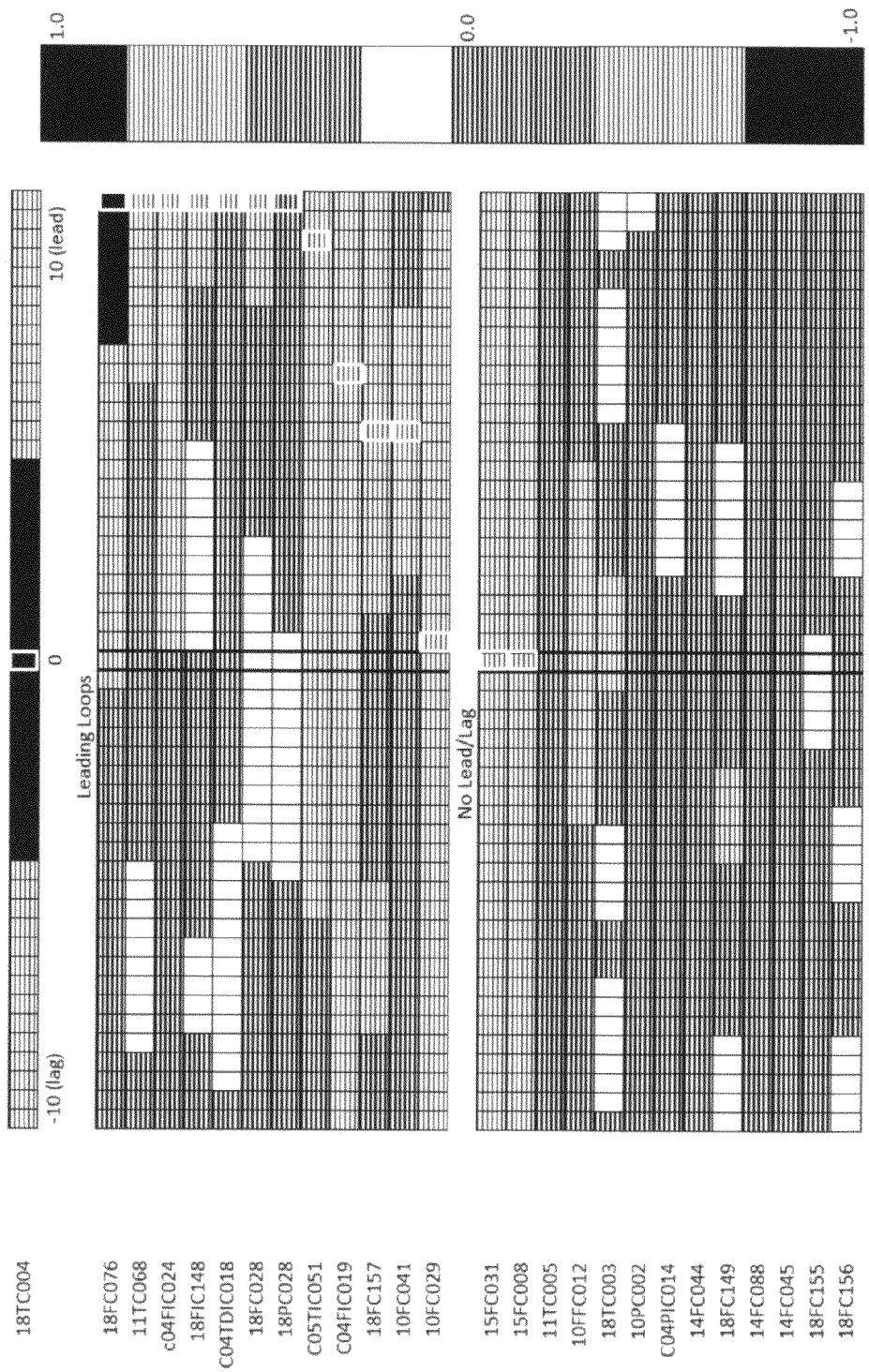
FIG. 3 shows a graphical representation of a matrix showing cross-correlation strengths, sorted by lead time.

FIG. 3 shows a graphical representation of a matrix showing cross-correlation strengths.

The graphical representation mimics the values shown in the matrix of CHART A. Each cell in the graphical display contains a color or pattern determined by the strength of correlation in the corresponding cell of the matrix. In FIG. 3, the cross-hatching is used to indicate the strength of correlation. White indicates little or no correlation, as correlations become stronger, cross-hatch lines become more dense. The strongest correlations are indicated by solid black.

The first row shows the reference signal and its auto-correlation.

Both positive and negative correlations are shown. It is the absolute value of the correlation that matters. Both positive and negative values are equally important.

A reference scale, shown at the right of the figure, can be used to relate strength of correlation with color or pattern displayed.

Where the peak value in a given row exceeds the correlation threshold, that cell may be highlighted. In this figure, some cells are shown with a white outline.

The names of the signals are shown at the left side of the figure. For example, 10FC029 might be a signal representing the flow of material in manufacturing facility.

This graphical representation may also be web-enabled, providing links, hover text, or additional information and functionality to the user.

FIG. 3 shows a graphical representation of a matrix showing cross-correlation strengths, sorted by lead time.

Figure 2:
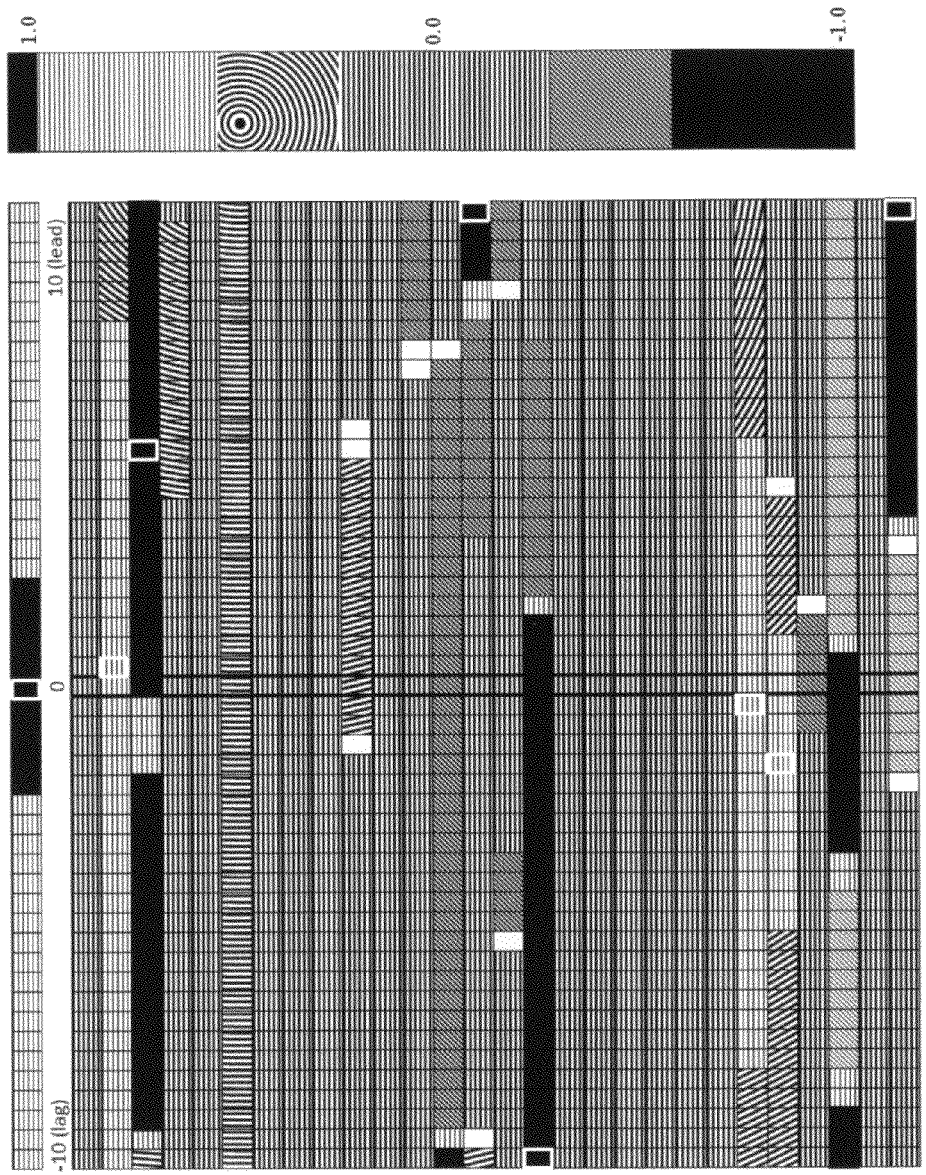
FIG. 2 shows a graphical representation of a matrix showing cross-correlation strengths.

This figure is similar to FIG. 2, except that the rows have been sorted according the values of the peak correlation lead/lag.

The most likely root cause is therefore the top-most row of this display.

DESCRIPTION

Preferred Embodiment

The following embodiment or variation of the invention is the embodiment presently preferred by the Inventor, but over time other embodiments and variations and uses in other areas may become preferred to those skilled in the art.

The ExperTune PlantTriage computer software carries out the preferred embodiment of the invention. It looks at time-series data from a primary reference variable, and cross-correlates that with similar data from many other measurements. From the cross-correlation results, the system determines the strengths of correlation and the respective lead or lag. The system then determines which measurement is the most likely root cause of variation in the primary measurement. The remaining measurements are ranked in order of likelihood that they are the root cause of variation. The present application discloses the Preferred Embodiment.

Cross-Correlation is "a measure of similarity of two waveforms as a function of a time-lag applied to one of them. This is also known as a sliding dot product or inner-product." The result of a cross-correlation analysis is a vector of values, with each value representing the strength of correlation at a specific time offset between the two signals.

Both the strength of the correlation and the lead/lag time are important in determining the root cause. In most processes, root causes will have a strong correlation with the downstream effects. Also, Root causes, by definition, occur first in time. So the most likely root cause will exhibit a strong correlation, and the longest lead time. The sliding dot product can be represented by Equation 1:

$$(f \star g)(t) \stackrel{def}{=} \int_{-\infty}^{\infty} f^*(\tau)g(t+\tau)d\tau;\qquad \text{Equation 1}$$

To determine the root cause, first determine the matrix of correlation strengths between the reference signal and many other signals. This matrix can be represented in tabular form as shown in CHART A.

CHART A

A matrix showing cross-correlation strengths.

| | ... | Three lags | Two Lags | One Lag | Zero Lead or Lag | One Lead | Two Leads | Three Leads | ... |
|---|---|---|---|---|---|---|---|---|---|
| Reference Signal | | $X_{00}(t-n)$ | $X_{00}(t-3)$ | $X_{00}(t-2)$ | $X_{00}(t-1)$ | $X_{00}(t)$ | $X_{00}(t+1)$ | $X_{00}(t+2)$ | $X_{00}(t+3)$ | $X_{00}(t+n)$ |
| Possible Cause #1 | | $X_{01}(t-n)$ | $X_{01}(t-3)$ | $X_{01}(t-2)$ | $X_{01}(t-1)$ | $X_{01}(t)$ | $X_{01}(t+1)$ | $X_{01}(t+2)$ | $X_{01}(t+3)$ | $X_{01}(t+n)$ |
| Possible Cause #2 | | $X_{02}(t-n)$ | $X_{02}(t-3)$ | $X_{02}(t-2)$ | $X_{02}(t-1)$ | $X_{02}(t)$ | $X_{02}(t+1)$ | $X_{02}(t+2)$ | $X_{02}(t+3)$ | $X_{02}(t+n)$ |
| Possible Cause #3 | | $X_{03}(t-n)$ | $X_{03}(t-3)$ | $X_{03}(t-2)$ | $X_{03}(t-1)$ | $X_{03}(t)$ | $X_{03}(t+1)$ | $X_{03}(t+2)$ | $X_{03}(t+3)$ | $X_{03}(t+n)$ |
| ... | | $X_{0Y}(t-n)$ | $X_{0Y}(t-3)$ | $X_{0Y}(t-2)$ | $X_{0Y}(t-1)$ | $X_{0Y}(t)$ | $X_{0Y}(t+1)$ | $X_{0Y}(t+2)$ | $X_{0Y}(t+3)$ | $X_{0Y}(t+n)$ |

To determine the root cause, first determine the matrix of correlation strengths between the reference signal and many other signals. This matrix can be represented in tabular form as shown in CHART B.

CHART B

A matrix showing cross-correlation strengths.

| | ... | 3 Minutes Lag | 2 Minutes Lag | 1 Minute Lag | Zero Lead or Lag | 1 Minute Lead | 2 Minutes Lead | 3 Minutes Lead | ... |
|---|---|---|---|---|---|---|---|---|---|
| Reference Signal | 0.03 | 0.04 | 0.32 | 0.73 | 1.0 | 0.71 | 0.29 | 0.04 | 0.01 |
| Possible Cause #1 | −0.11 | −0.21 | −0.61 | −0.37 | −0.04 | −0.03 | −0.01 | 0.21 | 0.47 |
| Possible Cause #2 | −0.05 | 0.03 | −0.02 | 0.04 | 0.42 | −0.93 | 0.72 | 0.11 | −0.01 |
| Possible Cause #3 | −0.02 | 0.03 | −0.01 | 0.01 | 0.02 | 0.02 | 0.53 | 0.81 | 0.62 |
| ... | 0.02 | 0.31 | 0.41 | 0.17 | −0.03 | 0.03 | −0.05 | 0.01 | 0.06 |

Where the value $X_{0Y}(t)$ in each cell represents the correlation coefficient between the reference signal (signal 0) and another signal (signal Y). Tables left and right from the center column represent the correlation coefficient when the reference signal is shifted in time. The amount of shift in time is indicated by t+S or t−S, when S is the number of time cells of the shift.

The matrix of coefficients can be represented graphically, as in FIG. 3. In this figure, the reference signal is shown as the top row. Cross-Hatching strengths in the top row indicate the auto-correlation of this signal. Proceeding rows show the cross-correlations of other signals with the reference signal. The strength of correlation at each time shift is represented by the hatching density. In each row, the time scale from left to right shows lagging to leading correlations. When the peak correlation strength exceeds the threshold, the peak cell is highlighted.

FIG. 3 shows a graphical representation of the matrix where the rows are appropriately sorted to determine the root cause. The reference signal is again shown at the top, and the most likely root cause item is listed in the second row of the chart. Proceeding rows show the remaining signals, in order of likelihood that they may be root cause of the variation in the reference signal.

In FIG. 3, the cross-hatching is used to indicate the strength of correlation. The vertical bar at the right side of the figure is a key matching the correlation strengths to the patterns. White indicates little or no correlation, as correlations become stronger, cross-hatch lines become more dense. The strongest correlations are indicated by solid black.

Operation of One Embodiment

The PlantTriage software of the present invention operates on a server-class personal computer. The software gathers real-time data from various control systems, data historians, programmable logic controllers, laboratory instruments, or other data sources. This data is stored in a local data historian to simplify data retrieval.

While the invention may be implemented in any programming language, such as BASIC, FORTRAN, or C, the current invention uses the Microsoft .NET libraries and C++. Further, the current PlantTriage software works with several other embedded software components, including the Windows Server operating system, Canary Labs Data Historian, SQL Server, Internet Information Services (IIS), and Microsoft Internet Explorer.

Using the Internet Explorer web-browser interface, the user requests a Process Interaction Map (PIM) from a menu selection, specifying the reference signal, the scope of the search for root cause, and the time period for analysis. The scope may be limited to signals within the same process unit operation, within a specified type of controllers (such as temperature controls), or even search across all possible causes in an entire group of facilities.

Note that the signals may include process data, raw material information, weather conditions, quality measurements, laboratory or analytical results, business data, or any other source of real-time information.

The data is retrieved from the Canary Labs historian. Plant-Triage software then performs the correlation analysis, followed by sorting of information and determination of root cause.

The results are passed through the IIS system, back to the browser-based user interface, to be displayed graphically.

Tests of One Embodiment

The root cause method was developed by working with actual data from many process plant scenarios. The data had previously been displayed in a Process Interaction Map, without use of peak detection, threshold comparison, and sorting. These methods were at first developed manually, then tested on many sets of data. Some analysis techniques were manually applied and showed tremendous value.

At this point, the automated methods were developed.

The root cause problem-solving capability has been successfully tested using live and historical data from client sites. In one instance in August 2011, the invention was tested against a data set from a steam production facility at a paper plant in Duluth, Minn.

This is a particularly relevant test, containing most of the important factors to demonstrate the advantages of this invention. First, it is a complex process, with many interactions from process flows, interaction control strategies, and operator interventions. Second, the data was presented for analysis to an engineer with no a-priori knowledge of this particular process or problem. Third, the final solution was known to a third party. A plant engineer had worked for several weeks, using traditional methods, to determine the true root cause.

After the data was loaded into a system for offline analysis, the software correctly identified the source of process upsets as the desuperheater controls on the boiler. What had taken four weeks to solve using traditional problem-solving techniques was solved within 20 minutes using this invention.

Additional Embodiments

1. The invention can be applied to event data, such as alarms, shut-downs, or quality deviations.
2. The invention can be automatically applied to event data, such that the root cause of an event can be reported immediately following the occurrence of the event.
3. The invention can be applied to correlated data sets of continuous data from outside the process industry, including the financial markets and weather analysis.
4. Once the root cause is identified, the data analysis can be inverted to develop a dynamic process model of the behavior.
5. The dynamic process models identified in 4 can be used as a prediction tool to estimate the future value of the reference signal. This can be used to warn operators of impending excursions.
6. The method may be applied to other processes that are not normally considered to be "continuous process operations". Such processes may include engines, aircraft and nautical systems, and biological measurements.

Alternative Embodiments

1. The invention can be modified to incorporate known process model information. This would allow the analysis to remove the contributions from known sources of variation, thereby revealing deeper understandings of the process dynamics.
2. The invention can be modified to update the correlation information in real-time, rather than on an as-requested basis.
3. The method of display of results may be simplified. Graphical display is not required, and a text-only message can be used.
4. The method may be implemented without a server-based machine, and without control systems.
5. Signals may come in a variety of forms, whether directly from instrumentation, in data files, databases, spreadsheets, or in data historians.
6. The invention may be embodied on a dedicated microprocessor, rather than a general-purpose computer.

CONCLUSIONS, RAMIFICATIONS AND SCOPE

A number of changes are possible to the methods, steps, equipment, etc. described above while still remaining within the scope and spirit of the invention. The specifics about the form and use of the invention described in this application (including the specifics in the Background, Field, Related Art, Summary, Purposes and Advantages, Abstract, Preferred Embodiment, Additional Embodiments, and Alternative Embodiments, Descriptions of the Drawings, etc.) are examples and are not intended to be limiting in scope. Those skilled in the art will recognize certain variations, modifications, permutations, additions, subtractions and sub-combinations thereof, and may discover new fields of use. The scope of the invention is to be determined by the claims and their legal equivalents, not the examples, purposes, summary, preferred embodiments, alternative or additional embodiments, operation, tests, parameters, or limitations etc. given above. It is intended that the claims are interpreted to include all such variations, modifications, additions, subtractions, permutations and sub-combinations as are within their true spirit and scope, including those which may be recognized later by those skilled in the art. Aspects, as described above, may be implemented in many different forms of software, firmware, and hardware in the implementations illustrated in the figures. The actual software code or specialized control hardware used to implement these aspects is not limiting of the description provided herein. Thus, the operation and behavior of the aspects were described without reference to the specific software code, it being understood that software and control hardware can be designed to implement the aspects based on the description herein.

Even though particular combinations of features are recited in the claims or disclosed in the specification, these combinations are not intended to limit the invention. In fact, many of these features may be combined in ways not specifically recited in the claims or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

I claim:

1. A method to identify the root cause of variations in an industrial process having a primary reference variable and other variables, comprising the steps of:
    (a) looking at time-series data from a primary reference variable,
    (b) cross-correlating the data in step (a) with similar data from many other variables,
    (c) using the results from step (b), determining the strengths of correlation and the respective lead and lag times of the variables,
    (d) using the correlation strengths and lead and lag times in step (c), determining which variable is the most likely root cause of variation in the primary reference variable, and
    (e) ranking the remaining variables in order of likelihood that they are the root cause of variation in the primary reference variable,
whereby the root cause of variations is identified for a primary reference variable.

2. The method of claim 1, wherein: (a) the correlations are evaluated on a scale from zero, being no correlation, to another number, being perfect correlation: (b) the correlations are evaluated across a range of time shifts in data (c) for each variable, the peak correlation and its corresponding time shift are defined; (d) some variables are disqualified because they do not show a strong correlation; and (e) a variable is selected which has the longest lead time at its peak correlation value:
whereby the variable in (c) is identified at the likely root cause of variation in the primary reference variable.

3. The method of claim 1, wherein no a priori process knowledge is used and no process models are used.

4. The method of claim 2, wherein no a priori process knowledge is used and no process models are used.

5. The method process of claim 1, applied to financial information, biological systems, weather data, discrete data sets, or continuous data sets.

6. The method of claim 2, applied to financial information, biological systems, weather data, discrete data sets, or continuous data sets.

7. The method of claim 1, further comprising analyzing historical variable data from the recent past, or a historical period, related to a particular incident in the process.

8. The method of claim 2, further comprising analyzing historical variable data from the recent past, or a historical period, related to a particular incident in the process.

9. The method of claim 7, wherein the historical data is simplified by cleansing or lumping or both.

10. The method of claim 8, wherein the historical data is simplified by cleansing or lumping or both.

11. The method of claim 1, wherein the cross-correlation analysis uses the historical data in the following equation:

$$(f \star g)(t) \stackrel{def}{=} \int_{-\infty}^{\infty} f^*(\tau) g(t + \tau) d\tau$$

wherein the symbol f stands for the primary reference variable, g stands for the variable being correlated as a possible root cause, t represents time, $\tau$ represents the time shift interval.

12. The method of claim 11, wherein the cross-correlation is accomplished using Fourier Transform analysis.

13. A method to identify the root cause of variations in a process having a primary reference variable and other variables, comprising the steps of:
    (a) selecting a reference variable,
    (b) select variables to investigate as possible causes,
    (c) retrieving historical data for all variables,
    (d) cross-correlating reference variables to each possible connection with another variable,
    (e) determining peak correlation magnitudes and lead or lag times of the variables,
    (f) eliminating variables with lagging correlation,
    (g) eliminating variables below selected correlation thresholds,
    (h) sorting remaining variables by lead times,
    (i) selecting the root cause based on the greatest lead time of the variables, and
    (j) displaying the root cause variable and other lead variables.

14. The method of claim 1 implemented by a computer program with or without an internet interface.

15. The method of claim 13 implemented by a computer program with or without an internet interface.

16. The method of claim 1 applied to engine operation, aircraft and nautical systems, or biological measurements.

17. The method of claim 13 applied to engine operation, aircraft and nautical systems, or biological measurements.

18. The method of claim 1 operating in real time operation of a process.

19. The method process of claim 11 operating in real time operation of a process.

20. The method of claim 13 operating in real time operation of a process.

* * * * *